United States Patent
Wu (10) Patent No.: US 12,517,545 B2
(45) Date of Patent: Jan. 6, 2026

(54) CLOCK ADJUSTMENT CIRCUIT USING PATTERN FILTER CIRCUIT TO SELECT PREDETERMINED DATA PATTERNS FOR PHASE ERROR DETECTION UNDER ACQUISITION MODE AND TRACKING MODE AND ASSOCIATED CLOCK ADJUSTMENT METHOD

(71) Applicant: MEDIATEK INC., Hsin-Chu (TW)

(72) Inventor: Po-Hsueh Wu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 361 days.

(21) Appl. No.: 18/131,879

(22) Filed: Apr. 7, 2023

(65) Prior Publication Data

US 2023/0367357 A1 Nov. 16, 2023

Related U.S. Application Data (60) Provisional application No. 63/340,485, filed on May 11, 2022.

(51) Int. Cl.
*G06F 1/08* (2006.01)
*G01R 25/00* (2006.01)

(52) U.S. Cl.
CPC ............... *G06F 1/08* (2013.01); *G01R 25/00* (2013.01)

(58) Field of Classification Search
CPC .................................. G06F 1/08; G01R 25/00
See application file for complete search history.

(56) References Cited

U.S. PATENT DOCUMENTS

| | | | | |
|---|---|---|---|---|
| 7,099,400 | B2* | 8/2006 | Yang | H04L 25/4917 375/294 |
| 9,699,009 | B1* | 7/2017 | Ainspan | H04L 25/49 |
| 9,841,804 | B2* | 12/2017 | Roy | G06F 1/324 |
| 10,129,015 | B2 | 11/2018 | Aleksić | |
| 10,892,763 | B1* | 1/2021 | Hidaka | H03L 7/0807 |
| 11,847,909 | B2* | 12/2023 | Arai | H04M 11/00 |

(Continued)

FOREIGN PATENT DOCUMENTS

| EP | 1 111 606 A1 | 6/2001 |
|---|---|---|
| TW | 201220702 A1 | 5/2012 |

OTHER PUBLICATIONS

Wahid Rahman et al., A 22.5-to-32-GB/s 3.2-pJ/b Referenceless Baud-Rate Digital CDR With DFE and CTLE in 28-nm CMOS, IEEE Journal of Solid-State Circuits, vol. 52, No. 12, Dec. 2017, p. 3517-3531, XP011673294 ,Dec. 2017.

*Primary Examiner* — Aurel Prifti
(74) *Attorney, Agent, or Firm* — Winston Hsu (57) ABSTRACT

A clock adjustment circuit includes a pattern filter circuit, a phase error detector (PED) circuit, and a phase error calculation circuit. The pattern filter circuit selects first predetermined data patterns from a plurality of consecutive data samples under an acquisition mode of the clock adjustment circuit, wherein the plurality of consecutive data samples are derived from an output of a first sampler circuit. The PED circuit detects phase errors according to an output of the pattern filter circuit and error samples derived from an output of a second sampler circuit. The phase error calculation circuit determines timing compensation of a sampling clock according to an output of the PED circuit, wherein the sampling clock is used by the first sampler circuit and the second sampler circuit.

18 Claims, 7 Drawing Sheets

(56) References Cited

U.S. PATENT DOCUMENTS

| | | | |
|---|---|---|---|
| 2011/0085081 A1* | 4/2011 | Tsai | H04N 5/04 |
| | | | 348/E5.009 |
| 2017/0038789 A1* | 2/2017 | Pal | G06F 1/08 |
| 2018/0167080 A1* | 6/2018 | Dyer | H03M 1/0624 |
| 2018/0227114 A1* | 8/2018 | Rahman | H03L 7/0807 |
| 2018/0278405 A1* | 9/2018 | Yao | H04L 7/0334 |
| 2019/0058576 A1* | 2/2019 | Lim | H04L 7/0334 |
| 2020/0186137 A1 | 6/2020 | Jiang | |
| 2021/0385060 A1 | 12/2021 | Van Ierssel | |
| 2023/0122734 A1* | 4/2023 | Chen | H03L 7/0807 |
| 2023/0308314 A1* | 9/2023 | Monga | H04L 25/03019 |

\* cited by examiner

CLOCK ADJUSTMENT CIRCUIT USING PATTERN FILTER CIRCUIT TO SELECT PREDETERMINED DATA PATTERNS FOR PHASE ERROR DETECTION UNDER ACQUISITION MODE AND TRACKING MODE AND ASSOCIATED CLOCK ADJUSTMENT METHOD

CROSS REFERENCE TO RELATED APPLICATIONS

This application claims the benefit of U.S. Provisional Application No. 63/340,485, filed on May 11, 2022. The content of the application is incorporated herein by reference.

BACKGROUND

The present invention relates to adjusting a clock signal, and more particularly, to a clock adjustment circuit using a pattern filter circuit to select predetermined data patterns for phase error detection under an acquisition mode and a tracking mode and an associated clock adjustment method.

A Serializer/Deserializer (SerDes) is a pair of functional blocks commonly used in high speed communications to compensate for limited input/output (I/O). These blocks convert data between serial data and parallel interfaces in each direction. The term "SerDes" generically refers to interfaces used in various technologies and applications. The primary use of a SerDes is to provide data transmission over a single line or a differential pair in order to minimize the number of I/O pins and interconnects. Clock and data recovery (CDR) circuitry is responsible for the proper time to sample an analog waveform of the high speed SerDes system. For example, a high speed SerDes receiver may employ Bang-bang CDR or Baud-rate CDR. The Bang-bang CDR has good performance but higher power consumption due to extra clock phase needed to sample the symbol edge information. Consequently, the Bang-bang CDR is not a good choice for low power applications. Compared to the Bang-bang CDR, the Baud-rate CDR has poor performance but lower power consumption due to only one sampling per symbol. Hence, the Baud-rate CDR is a good choice for low power applications. However, the Baud-rate CDR may suffer from a multiple lock phase issue. That is, the Baud-rate CDR may lock on different lock phases for different initial phases, where only one of the different lock phases is a proper one, and other lock phases may cause decision errors.

Thus, there is a need for an innovative solution which is capable of addressing the multiple lock phase issue of the Baud-rate CDR, and is capable of working well with a clock generator circuit that employs one of several possible I/O architecture including common clock architecture, forward clock architecture, and embedded clock architecture.

SUMMARY

One of the objectives of the claimed invention is to provide a clock adjustment circuit using a pattern filter circuit to select predetermined data patterns for phase error detection under an acquisition mode and a tracking mode and an associated clock adjustment method.

According to a first aspect of the present invention, an exemplary clock adjustment circuit is disclosed. The exemplary clock adjustment circuit includes a pattern filter circuit, a phase error detector (PED) circuit, and a phase error calculation circuit. The pattern filter circuit is arranged to select first predetermined data patterns from a plurality of consecutive data samples under an acquisition mode of the clock adjustment circuit, wherein the plurality of consecutive data samples are derived from an output of a first sampler circuit. The PED circuit is arranged to detect phase errors according to an output of the pattern filter circuit and error samples derived from an output of a second sampler circuit. The phase error calculation circuit is arranged to determine timing compensation of a sampling clock according to an output of the PED circuit, wherein the sampling clock is used by the first sampler circuit and the second sampler circuit.

According to a second aspect of the present invention, an exemplary clock adjustment method is disclosed. The exemplary clock adjustment method includes: performing a pattern filtering operation for selecting first predetermined data patterns from a plurality of consecutive data samples under an acquisition mode of the clock adjustment method, wherein the plurality of consecutive data samples are derived from an output of a first sampler circuit; performing phase error detection for detecting phase errors according to an output of the pattern filtering operation and error samples derived from an output of a second sampling operation; and performing a phase error calculation operation for determining timing compensation of a sampling clock according to an output of the phase error detection, wherein the sampling clock is used by the first sampling operation and the second sampling operation.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
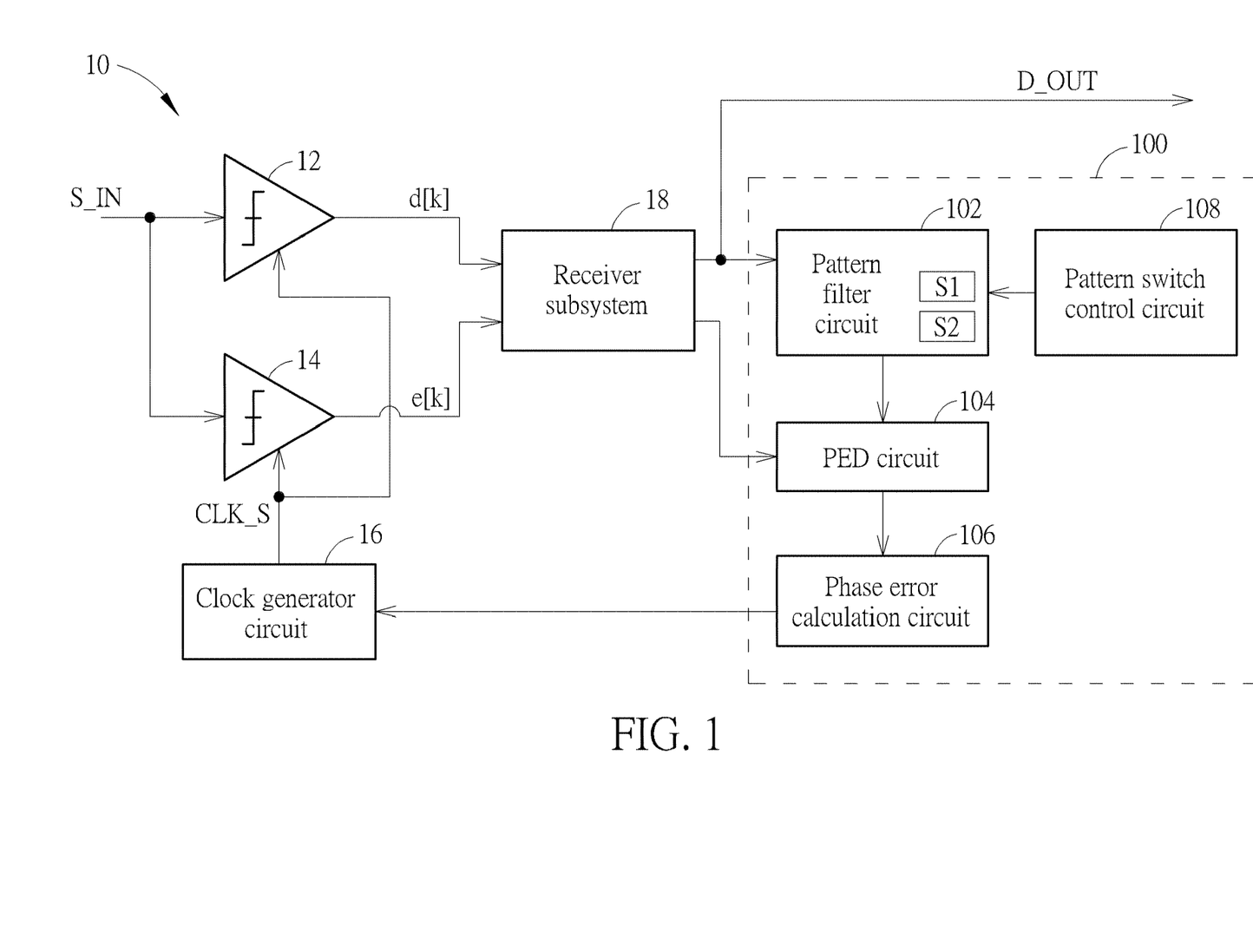
FIG. 1 is a diagram illustrating a first application using a clock adjustment circuit with acquisition (ACQ) pattern selection and tracking (TRK) pattern selection according to an embodiment of the present invention.

FIG. 1 is a diagram illustrating a first application using a clock adjustment circuit with acquisition (ACQ) pattern selection and tracking (TRK) pattern selection according to an embodiment of the present invention. By way of example, but not limitation, the clock adjustment circuit 100 may be a part of a Baud-rate clock and data recovery (CDR) circuit. For example, the Baud-rate CDR circuit may be employed by a high speed SerDes receiver 10. In this embodiment, the high speed SerDes receiver 10 includes a plurality of sampler circuits 12, 14, a clock generator circuit 16, a receiver subsystem 18, and the clock adjustment circuit 100. The clock adjustment circuit 100 includes a pattern filter circuit 102, a phase error detector (PED) circuit 104, a phase error calculation circuit 106, and a pattern switch control circuit 108. The high speed SerDes receiver 10 is arranged to receive a data input signal (analog signal) S_IN, and derive transmitted data from the analog input signal S_IN to generate a data output signal (digital signal) D_OUT. For example, the data input signal S_IN is an n-level pulse amplitude modulation (PAMn) signal transmitted from a high speed SerDes transmitter (not shown), and the data output signal D_OUT includes PAMn-encoded data extracted from the data input signal S_IN.

The sampler circuit 12 may be implemented by a slicer or an analog-to-digital converter. The sampler circuit 12 is arranged to sample the analog input signal S_IN according to a sampling clock CLK_S generated from the clock generator circuit 16, and generate and output a plurality of consecutive data samples d[k]. The sampler circuit 14 may be implemented by a slicer or an analog-to-digital converter. The sampler circuit 14 is arranged to sample the analog input signal S_IN according to the sampling clock CLK_S generated from the clock generator circuit 16, and generate and output a plurality of error samples e [k] corresponding to the consecutive data samples d[k], respectively. Taking a PAM4 signal as an example of the analog input signal S_IN, two-bit data are encoded into a four-level symbol that gets transmitted every clock unit interval (UI), such that a data sample obtained by the sampler circuit 12 may be a four-level symbol selected from {+3, +1, −1, −3}. Specifically, when the sampled voltage of the data sample is higher than a top threshold, the data sample is decided to be +3; when the sampled voltage of the data sample is between the top threshold and a middle threshold, the data sample is decided to be +1; when the sampled voltage of the data sample is between the middle threshold and a bottom threshold, the data sample is decided to be −1; and when the sampled voltage of the data sample is lower than the bottom threshold, the data sample is decided to be −3. The error sample in each UI can be derived by comparing an actual sampled voltage with a target reference voltage. The receiver subsystem 18 may contain an equalizer and/or other signal processing function(s).

Since the clock adjustment circuit 100 is a part of the Baud-rate CDR circuit, the clock adjustment circuit 100 is arranged to deal with timing recovery. The pattern filter circuit 102 is arranged to select first predetermined data patterns from consecutive data samples under an ACQ mode of the clock adjustment circuit 100, wherein the consecutive data samples are derived from an output of the sampler circuit 12. In this embodiment, the consecutive data samples d[k] are received by the pattern filter circuit 102 after passing through the receiver subsystem 18. Specifically, the pattern filter circuit 102 performs ACQ pattern selection upon consecutive data samples, such that the first predetermined data patterns act as ACQ patterns used by the PED circuit 104 under the ACQ mode, and the rest of the data patterns included in the consecutive data samples are blocked from arriving at the PED circuit 104. The PED circuit 104 is arranged to detect phase errors according to an output of the pattern filter circuit 102 and error samples derived from an output of the sampler circuit 14. Specifically, the PED circuit 104 employs a PED function for phase error detection, where an output of the PED function depends on data sample(s) and error sample(s). As mentioned above, the typical Baud-rate CDR suffers from the multiple lock phase issue, where the root cause of the multiple lock phases is the decision error that provides erroneous timing information.

Figure 2:
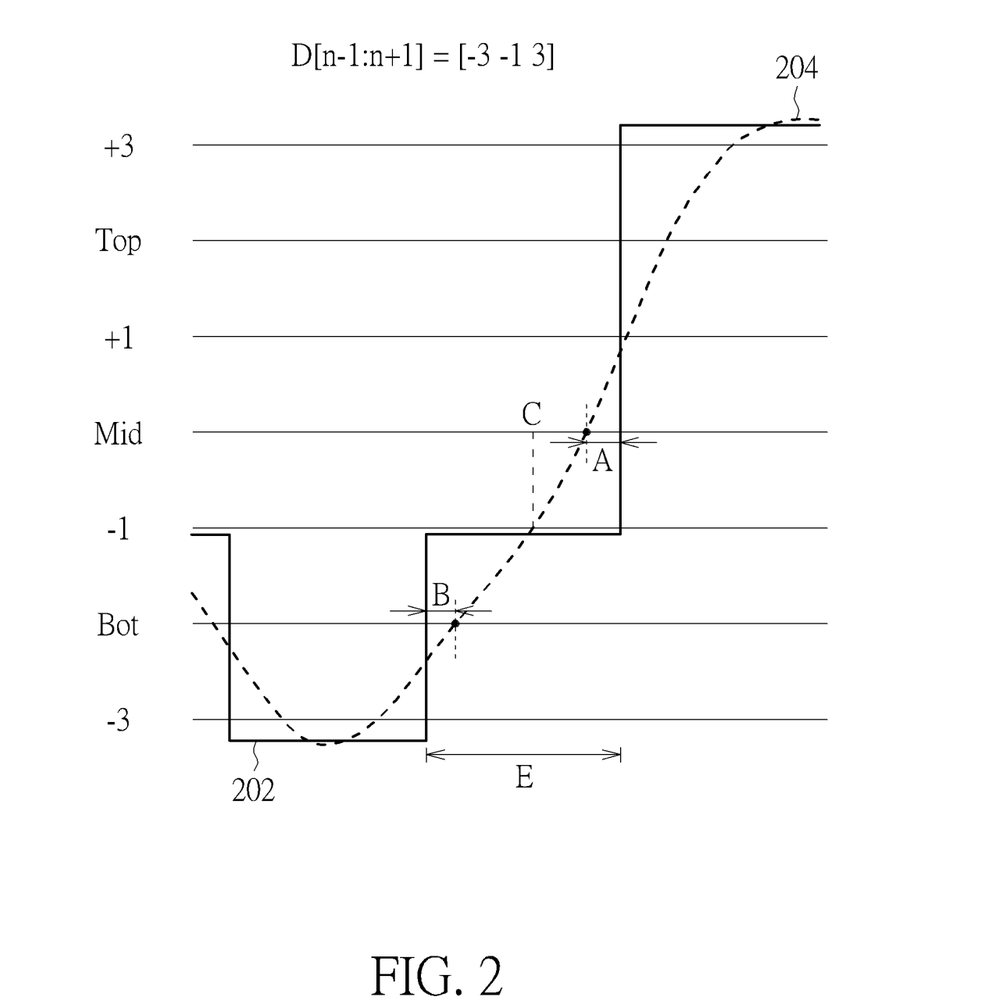
FIG. 2 is a diagram illustrating an example of the root cause of the multiple lock phases.

FIG. 2 is a diagram illustrating an example of the root cause of the multiple lock phases. Suppose that three consecutive PAM4 symbols D[n−1:n+1] are [−3 −1 3]. The ideal transitions of the consecutive PAM4 symbols [−3 −1 3] are illustrated by the characteristic curve 202. Intersymbol interference (ISI) is a form of distortion of a signal in which one symbol interferes with subsequent symbols. Hence, an actual analog waveform of the consecutive PAM4 symbols [−3 −1 3] is deviated from an ideal analog waveform of the consecutive PAM4 symbols [−3 −1 3] due to ISI. The actual transitions of the consecutive PAM4 symbols [−3 −1 3] are illustrated by the characteristic curve 204. E represents a possible sampling range for D[n] at CDR initialization. C represents a good sampling point without decision error. In a case where sampling is performed within range 'A', the timing is late. Since the CDR locks too late, D[n] decision error occurs, and the sampling result of the consecutive PAM4 symbols [−3 −1 3] becomes [−3, 1 3]. Furthermore, since the sampled voltage of D[n] is lower than the reference voltage level +1 (which is an ideal voltage level of the PAM4 symbol "1"), the associated error sample is a negative value indicating that the CDR locks too early, which is different from the actual condition that the sampling timing is late and thus provides erroneous timing information. In another case where sampling is performed within range 'B', the timing is early. Since the CDR locks too early, D[n] decision error occurs, and the sampling result of the consecutive PAM4 symbols [−3 −1 3] becomes [−3 −3 1]. Furthermore, since the sampled voltage of D[n] is higher than the reference voltage level −3 (which is an ideal voltage level of the PAM4 symbol "−3"), the associated error sample is a positive value indicating that the CDR locks too late, which is different from the actual condition that the sampling timing is early and thus provides erroneous timing information. To put it simply, when an analog waveform of a data pattern that consists of consecutive data samples (e.g., PAM4 symbols) suffers from serious ISI, an output of the PED function may indicate an incorrect phase error, and may make the Baud-rate CDR approach a lock phase that is deviated from the correct one.

Figure 3:
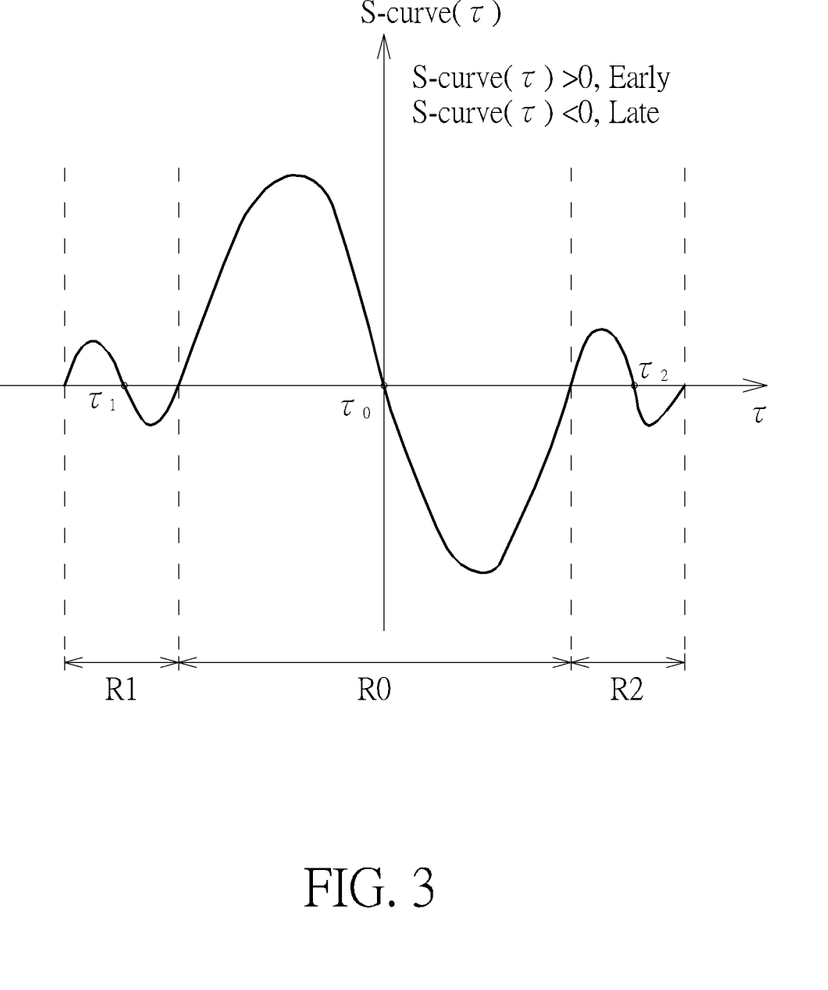
FIG. 3 is a diagram illustrating an S-curve of a phase error detector (PED) function that has multiple lock phases for Baud-rate CDR under a condition that a data pattern used by the PED function has decision errors caused by ISI.

FIG. 3 is a diagram illustrating an S-curve of the PED function that has multiple lock phases for Baud-rate CDR under a condition that a data pattern used by the PED function has decision errors caused by ISI. The output of the PED function is represented by S-curve($\tau$) that is a function of the CDR lock point $\tau$. A negative-slope zero-crossing point of the S-curve of the PED function represents one possible CDR lock phase. When the CDR initial phase is within the capture range R0, the output of the PED function (i.e., S-curve($\tau$)) is indicative of a phase error between the current CDR lock point and the CDR lock phase $\tau_0$ (which is a correct lock phase), and is referenced to adjust the current CDR lock point to make it approach the CDR lock phase $\tau_0$, where S-curve($\tau_0$)=0. When the CDR initial phase is within the capture range R1, the output of the PED function (i.e., S-curve($\tau$) is indicative of a phase error between the current CDR lock point and the CDR lock phase $\tau_1$ (which is an incorrect lock phase), and is referenced to adjust the current CDR lock point to make it approach the CDR lock phase $\tau_1$, where S-curve($\tau_1$)=0. When the CDR initial phase is within the capture range R2, the output of the PED function (i.e., S-curve($\tau$) is indicative of a phase error between the current CDR lock point and the CDR lock phase $\tau_2$ (which is an incorrect lock phase), and is referenced to adjust the current CDR lock point to make it approach the CDR lock phase $\tau_2$, where S-curve($\tau_2$)=0.

As mentioned above, when an analog waveform of a data pattern that consists of consecutive data samples (e.g., PAM4 symbols) suffers from serious ISI, an output of the PED function may indicate an incorrect phase error, and may make Baud-rate CDR approach a lock phase deviated from the correct one. To address this multiple lock phase issue encountered in the ACQ mode, the present invention proposes ACQ pattern selection to select first predetermined data patterns S1 from consecutive data samples under the ACQ mode of the clock adjustment circuit 100, where each of the first predetermined data patterns S1 ensures that the PED function does not have multiple lock phases. For example, each of the first predetermined data patterns (i.e., ACQ patterns) S1 includes a plurality of data samples, and a signal level difference between any two data samples among the data samples are constrained within a predetermined range.

Taking a PAM4 signal as an example of the analog input signal S_IN, two-bit data are encoded into a four-level symbol that gets transmitted every UI, such that a data sample obtained by the sampler circuit 12 may be a four-level symbol selected from {+3, +1, −1, −3}. Suppose that each of the first predetermined data patterns (i.e., ACQ patterns) S1 includes a sequence of D[n−1], D[n], and D[n+1]. Since each of D[n−1], D[n], and D[n+1] may be a four-level symbol selected from {+3, +1, −1, −3}, the sequence of D[n−1], D[n], and D[n+1] may have 64 combinations. Any data pattern that meets one of D[n−1]≤D[n]<D[n+1], D[n−1]<D[n]≤D[n+1], D[n−1]≥D[n]>D[n+1], and D[n−1]>D[n]≥D[n+1] may have timing information. Hence, among 64 data patterns, there are 32 data patterns that may have timing information. However, some of these data patterns with timing information may have multiple lock phases. The pattern filter circuit 102 is designed to select data patterns with timing information that do not have multiple lock phases.

When the signal level difference among D[n−1:n+1] is smaller, there is lower error probability of D[n] decision error. One or more of the following ACQ pattern selection rules may be employed for selecting the first predetermined data patterns (i.e., ACQ patterns) S1. In accordance with a first ACQ pattern selection rule, D[n] is equal to +3 or −3. The reason is that the largest symbols (e.g., ±3 for PAM4) have more ability against ISI. In accordance with a second ACQ pattern selection rule, D[n] is equal to D[n−1], and D[n+1] is equal to +1 or −1. In accordance with a third ACQ pattern selection rule, D[n] is equal to D[n+1], and D[n−1] is equal to +1 or −1. Hence, the first predetermined data patterns (i.e., ACQ patterns) S1 in compliance with the ACQ pattern selection rules are listed in the following table.

| D [n − 1] | D [n] | D [n + 1] |
|---|---|---|
| −3 | −3 | 1 |
| −3 | −3 | −1 |
| 3 | 3 | 1 |
| 3 | 3 | −1 |
| 1 | −3 | −3 |
| −1 | −3 | −3 |
| 1 | 3 | 3 |
| −1 | 3 | 3 |

Figure 4:
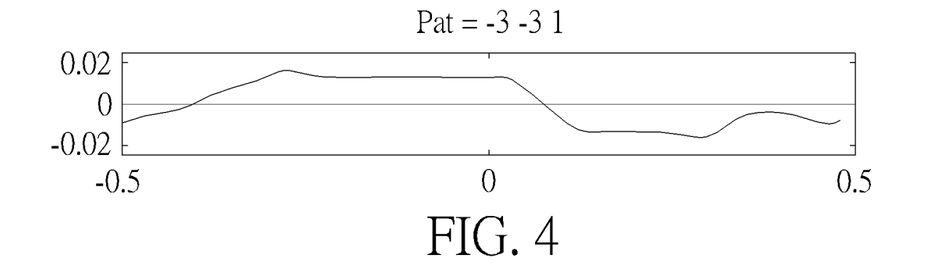
FIG. 4 is a diagram illustrating an S-curve of the PED function that has only a single lock phase for Baud-rate CDR under a condition that a data pattern $D[n-1:n+1]=[-3\ -3\ 1]$ is selected as one ACQ pattern used by the PED circuit shown in FIG. 1.
Figure 5:
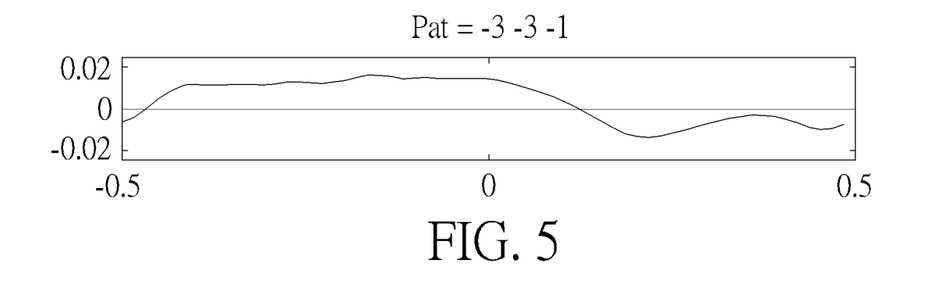
FIG. 5 is a diagram illustrating an S-curve of the PED function that has only a single lock phase for Baud-rate CDR under a condition that a data pattern $D[n-1:n+1]=[-3\ -3\ -1]$ is selected as one ACQ pattern used by the PED circuit shown in FIG. 1.
Figure 6:
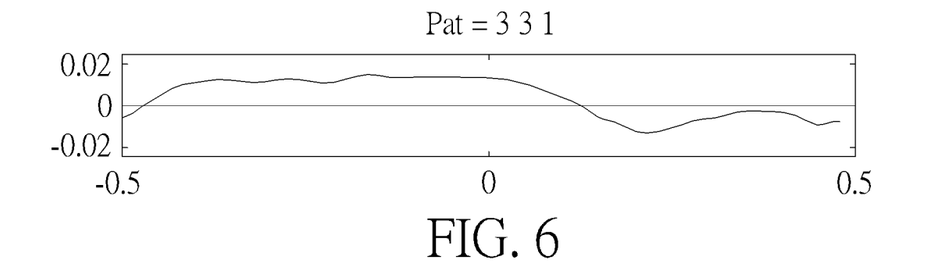
FIG. 6 is a diagram illustrating an S-curve of the PED function that has only a single lock phase for Baud-rate CDR under a condition that a data pattern $D[n-1:n+1]=[3\ 3\ 1]$ is selected as one ACQ pattern used by the PED circuit shown in FIG. 1.
Figure 7:
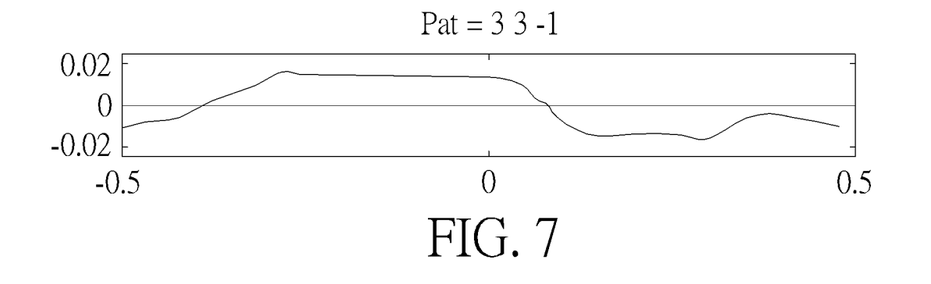
FIG. 7 is a diagram illustrating an S-curve of the PED function that has only a single lock phase for Baud-rate CDR under a condition that a data pattern $D[n-1:n+1]=[3\ 3\ -1]$ is selected as one ACQ pattern used by the PED circuit shown in FIG. 1.
Figure 8:
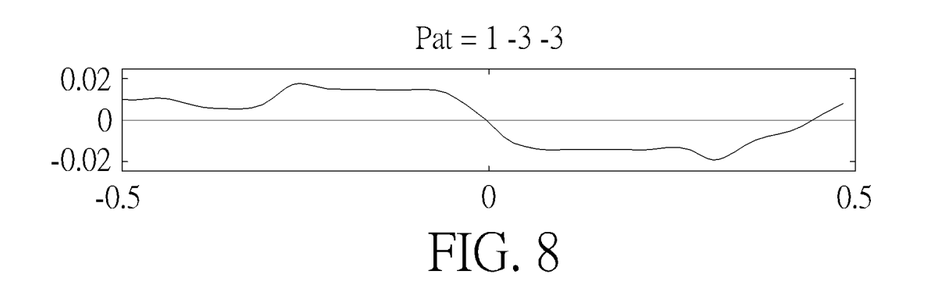
FIG. 8 is a diagram illustrating an S-curve of the PED function that has only a single lock phase for Baud-rate CDR under a condition that a data pattern D[n−1:n+1]=[1 −3 −3] is selected as one ACQ pattern used by the PED circuit shown in FIG. 1.
Figure 9:
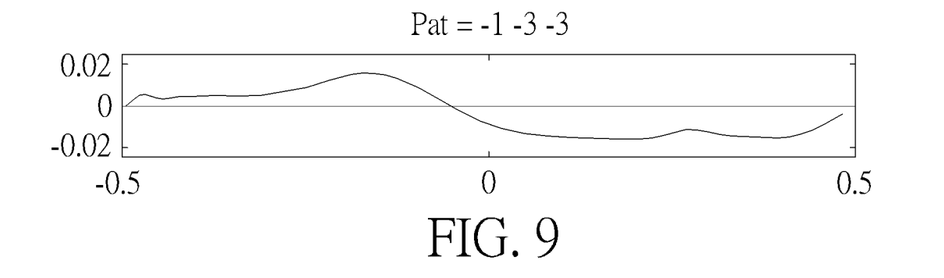
FIG. 9 is a diagram illustrating an S-curve of the PED function that has only a single lock phase for Baud-rate CDR under a condition that a data pattern D[n−1:n+1]=[−1 −3 −3] is selected as one ACQ pattern used by the PED circuit shown in FIG. 1.
Figure 10:
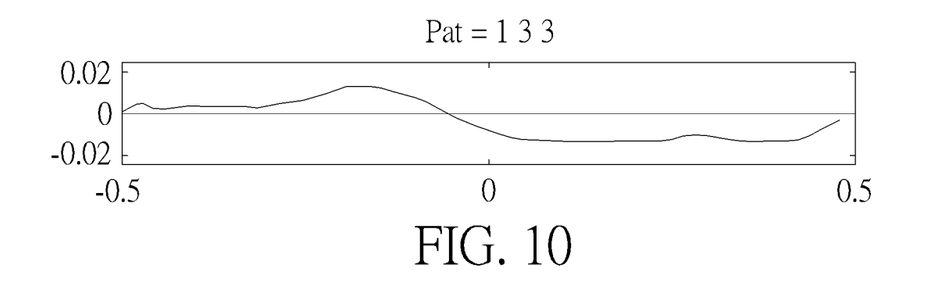
FIG. 10 is a diagram illustrating an S-curve of the PED function that has only a single lock phase for Baud-rate CDR under a condition that a data pattern D[n−1:n+1]=[1 3 3] is selected as one ACQ pattern used by the PED circuit shown in FIG. 1.
Figure 11:
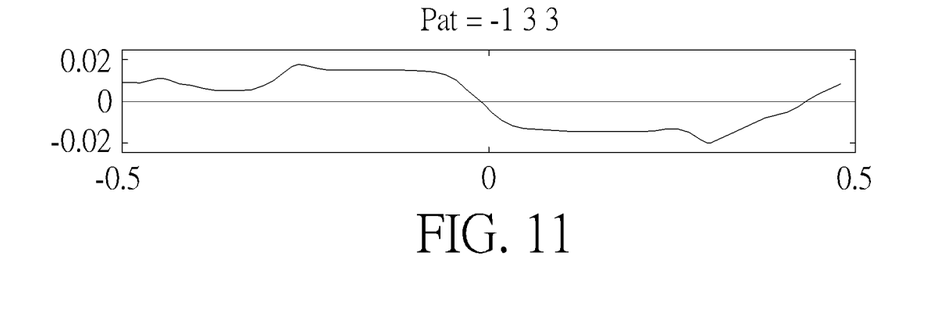
FIG. 11 is a diagram illustrating an S-curve of the PED function that has only a single lock phase for Baud-rate CDR under a condition that a data pattern D[n−1:n+1]=[−1 3 3] is selected as one ACQ pattern used by the PED circuit shown in FIG. 1.

In accordance with the design of the PED function employed by the PED circuit 104, a negative-slope zero-crossing point of the S-curve of the PED function represents one possible CDR lock phase. FIG. 4 is a diagram illustrating an S-curve of the PED function that has only a single lock phase for Baud-rate CDR under a condition that a data pattern D[n−1:n+1]=[−3 −3 1] is selected as one ACQ pattern used by the PED circuit 104. FIG. 5 is a diagram illustrating an S-curve of the PED function that has only a single lock phase for Baud-rate CDR under a condition that a data pattern D[n−1:n+1]=[−3 −3 −1] is selected as one ACQ pattern used by the PED circuit 104. FIG. 6 is a diagram illustrating an S-curve of the PED function that has only a single lock phase for Baud-rate CDR under a condition that a data pattern D[n−1:n+1]=[3 3 1] is selected as one ACQ pattern used by the PED circuit 104. FIG. 7 is a diagram illustrating an S-curve of the PED function that has only a single lock phase for Baud-rate CDR under a condition that a data pattern D[n−1:n+1]=[3 3 −1] is selected as one ACQ pattern used by the PED circuit 104. FIG. 8 is a diagram illustrating an S-curve of the PED function that has only a single lock phase for Baud-rate CDR under a condition that a data pattern D[n−1:n+1]=[1 −3 −3] is selected as one ACQ pattern used by the PED circuit 104. FIG. 9 is a diagram illustrating an S-curve of the PED function that has only a single lock phase for Baud-rate CDR under a condition that a data pattern D[n−1:n+1]=[−1 −3 −3] is selected as one ACQ pattern used by the PED circuit 104. FIG. 10 is a diagram illustrating an S-curve of the PED function that has only a single lock phase for Baud-rate CDR under a condition that a data pattern D[n−1:n+1]=[1 3 3] is selected as one ACQ pattern used by the PED circuit 104. FIG. 11 is a diagram illustrating an S-curve of the PED function that has only a single lock phase for Baud-rate CDR under a condition that a data pattern D[n−1:n+1]=[−1 3 3] is selected as one ACQ pattern used by the PED circuit 104.

Since some data patterns that have multiple lock phases for Baud-rate CDR are filtered out by the pattern filter circuit 102, there is no need to control the CDR initial phase. In addition, since an S-curve of the PED function has only a single lock phase for Baud-rate CDR under each of the first predetermined data patterns (i.e., ACQ patterns) S1, a wide capture range for SerDes timing recovery can be achieved, as illustrated in FIGS. 4-11.

An output of the PED circuit 104 (e.g., S-curve(τ)) is indicative of a phase error between the current CDR lock point and the desired CDR lock phase. The phase error calculation circuit 106 is arranged to determine timing compensation of the sampling clock CLK_S according to the output of the PED circuit 104, and instruct the clock generator circuit 16 to apply the timing compensation to the sampling clock CLK_S that is used by the sampler circuit (e.g., data slicer) 12 and the sampler circuit (e.g., CDR slicer) 14. For example, the phase error calculation circuit 106 may collect timing errors of different received PAMn symbols (e.g., PAM4 symbols) that are provided from the PED circuit 104, and accumulate the collected timing errors to provide timing compensation to the clock generator circuit 16. However, this is for illustrative purposes only, and is not meant to be a limitation of the present invention.

The clock adjustment circuit 100 makes the CDR circuit (particularly, Baud-rate CDR circuit) locks at S-curve negative slope and zero-crossing point. Regarding each of the first predetermined data patterns (i.e., ACQ patterns) S1 mentioned above, it may have a small slope around the desired lock phase. Hence, each of the first predetermined data patterns (i.e., ACQ patterns) S1 is particularly selected to have a wide capture range, but may be less sensitive to a sampling timing change with respect to the desired lock phase. To address this issue, the present invention proposes choosing ACQ patterns with lower decision error probability of D[n] for preventing multiple lock phases and choosing TRK patterns with large S-curve slopes around D[n] for better CDR performance. As shown in FIG. 1, the pattern switch control circuit 108 is included in the clock adjustment circuit 100. When the clock adjustment circuit 100 is switched from the ACQ mode to the TRK mode due to the CDR lock point being close to the desired lock phase, the pattern switch control circuit 108 is operative to instruct the pattern filter circuit 102 to select second predetermined data patterns (i.e., TRK patterns) S2 from the consecutive data samples under the TRK mode of the clock adjustment circuit 100, where each of the second predetermined data patterns (i.e., TRK patterns) S2 is different from any of the first predetermined data patterns (i.e., ACQ patterns) S1.

Taking a PAM4 signal as an example of the analog input signal S_IN, two-bit data are encoded into a four-level symbol that gets transmitted every UI, such that a data sample obtained by the sampler circuit 12 may be a four-level symbol selected from {+3, +1, −1, −3}. Suppose that each of the second predetermined data patterns (i.e., TRK patterns) S2 includes a sequence of D[n−1], D[n], and D[n+1]. Each of the second predetermined data patterns (i.e., TRK patterns) S2 is required to have a large S-curve slope around the desired lock phase. For example, the second predetermined data patterns (i.e., ACQ patterns) S2 in compliance with the TRK pattern selection rule are listed in the following table.

| D [n − 1] | D [n] | D [n + 1] |
|---|---|---|
| −3 | −1 | −1 |
| −3 | −1 | 1 |
| −3 | −1 | 3 |
| −3 | 1 | 1 |
| −3 | 1 | 3 |
| −1 | −1 | −3 |
| −1 | −1 | 1 |
| −1 | −1 | 3 |
| −1 | 1 | 1 |
| −1 | 1 | 3 |
| 1 | −1 | −3 |
| 1 | −1 | −1 |
| 1 | 1 | −3 |
| 1 | 1 | −1 |
| 1 | 1 | 3 |
| 3 | −1 | −3 |
| 3 | −1 | −1 |
| 3 | 1 | −3 |
| 3 | 1 | −1 |
| 3 | 1 | 1 |

Figure 12:
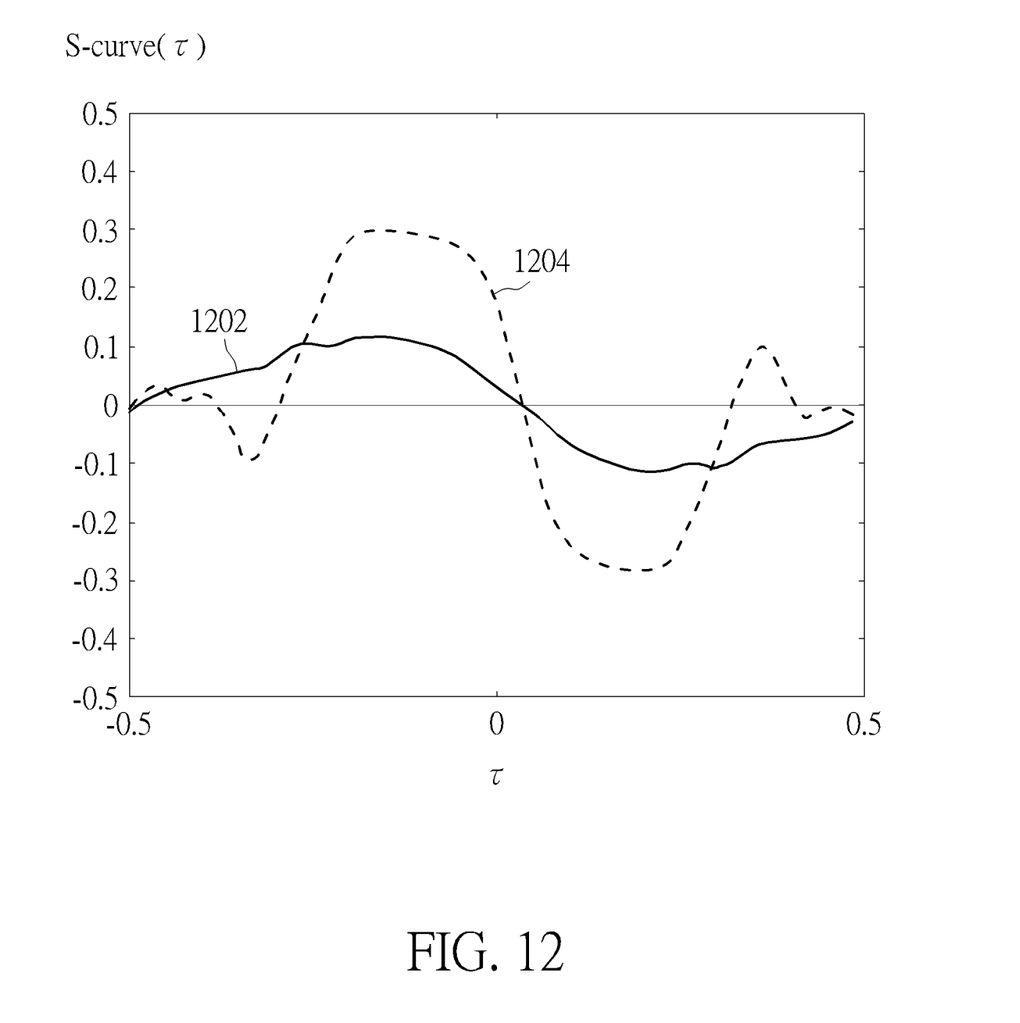
FIG. 12 is a diagram illustrating a concept of CDR pattern switching according to embodiment of the present invention.

FIG. 12 is a diagram illustrating a concept of CDR pattern switching according to embodiment of the present invention. An S-curve with a larger slope at the lock phase (i.e., negative-slope zero-crossing point) will have better CDR quality. Hence, the Baud-rate CDR circuit using the TRK pattern 1204 for phase error detection under the TRK mode can have better performance. However, the Baud-rate CDR circuit using the TRK pattern 1204 for phase error detection under the ACQ mode suffers from the multiple lock phase issue. In this embodiment, the Baud-rate CDR circuit using the ACQ pattern 1202 for phase error detection under the ACQ mode can prevent the multiple lock phase issue caused by the TRK pattern 1204. To put it simply, different CDR methods are used by the ACQ mode and the TRK mode to solve different issues. Furthermore, the ACQ-mode CDR and the TRK-mode CDR share most hardware, and only the pattern filter 102 is required to change data patterns selected for following phase error detection.

In the above embodiment, the proposed clock adjustment circuit 100 is employed by a high speed SerDes receiver using a Baud-rate CDR circuit for timing recovery. However, this is for illustrative purposes only, and is not meant to be a limitation of the present invention. In practice, any application using the proposed clock adjustment circuit 100 falls within the scope of the present invention.

Figure 13:
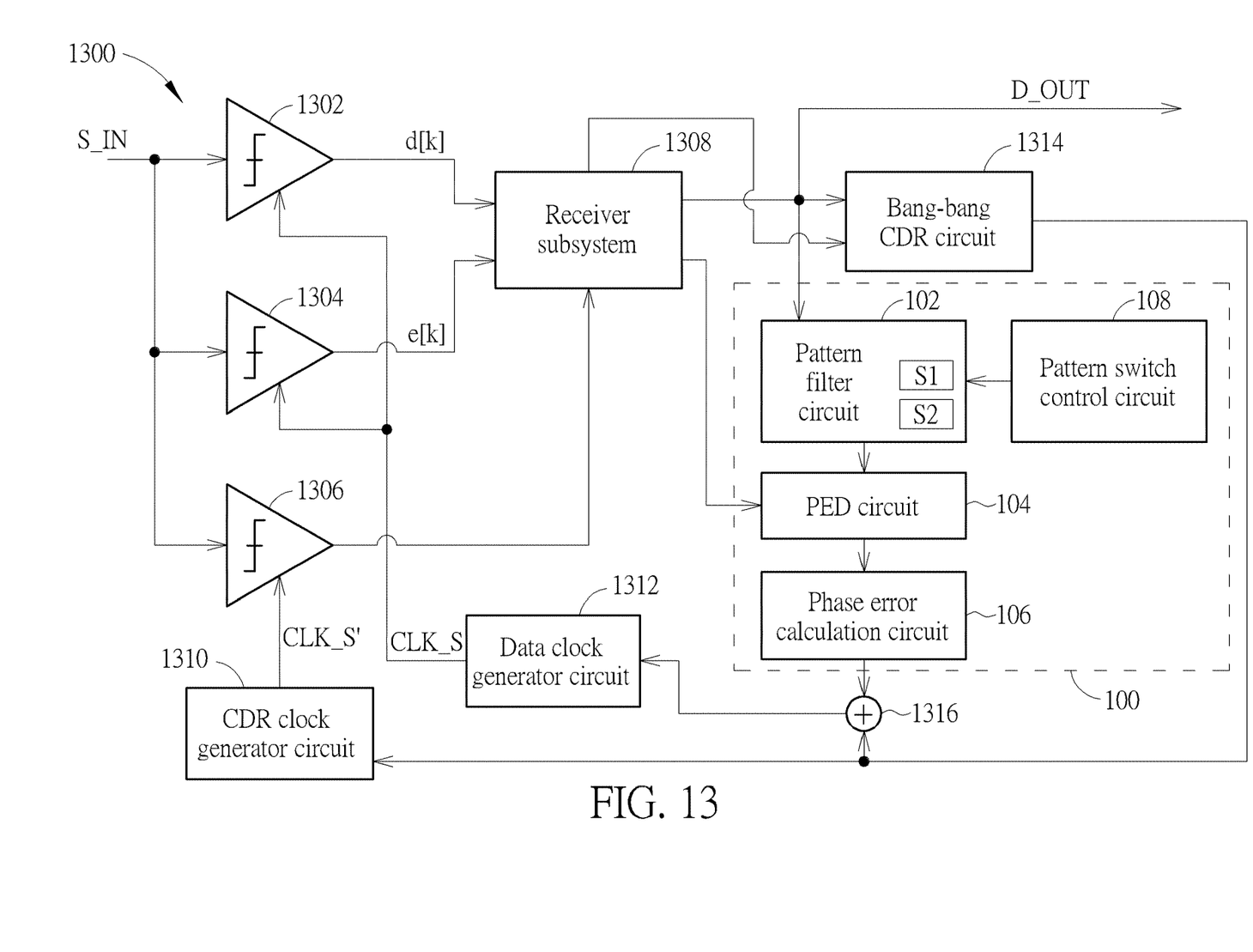
FIG. 13 is a diagram illustrating a second application using a clock adjustment circuit with ACQ pattern selection and TRK pattern selection according to an embodiment of the present invention.

FIG. 13 is a diagram illustrating a second application using a clock adjustment circuit with ACQ pattern selection and TRK pattern selection according to an embodiment of the present invention. By way of example, but not limitation, the clock adjustment circuit 100 may be a part of an application using a Bang-bang CDR circuit. For example, the Bang-bang CDR circuit may be employed by a high speed SerDes receiver 1300. The high speed SerDes receiver 1300 includes a plurality of sampler circuits 1302, 1304, 1306, a receiver subsystem 1308, a CDR clock generator circuit 1310, a data clock generator circuit 1312, a Bang-bang CDR circuit 1314, a combining circuit 1316, and the aforementioned clock adjustment circuit 100.

The high speed SerDes receiver 1300 is arranged to receive a data input signal (analog signal) S_IN, and derive transmitted data from the analog input signal S_IN to generate a data output signal (digital signal) D_OUT. For example, the data input signal S_IN is an n-level pulse amplitude modulation (PAMn) signal transmitted from a high speed SerDes transmitter (not shown), and the data output signal D_OUT includes PAMn-encoded data. The sampler circuit 1302 may be implemented by a slicer or an analog-to-digital converter. Like the sampler circuit 12 shown in FIG. 1, the sampler circuit (e.g., data slicer) 1302 is arranged to sample the analog input signal S_IN according to a sampling clock CLK_S generated from the data clock generator circuit 1312, and generate and output a plurality of consecutive data samples d[k]. The sampler circuit 1304 may be implemented by a slicer or an analog-to-digital converter. Like the sampler circuit 14 shown in FIG. 1, the sampler circuit (e.g., skew slicer) 1304 is arranged to sample the analog input signal S_IN according to the sampling clock CLK_S generated from the data clock generator circuit 1312, and generate and output a plurality of error samples e[k] corresponding to the consecutive data samples d[k], respectively. The sampler circuit 1306 may be implemented by a slicer or an analog-to-digital converter. The sampler circuit (e.g., CDR slicer) 1306 is arranged to sample the analog input signal S_IN according to another sampling clock CLK_S' generated from the CDR clock generator circuit 1310, and generate and output symbol edge information needed by the Bang-bang CDR circuit 1314. Like the receiver subsystem 18 shown in FIG. 1, the receiver subsystem 1308 may contain an equalizer and/or other signal processing function(s).

To meet the high performance requirement, the high speed SerDes receiver 1300 may adopt the Bang-bang CDR circuit 1314. To prevent double clock frequency requirement, the high speed SerDes receiver 1300 uses two clock generator circuits, including the data clock generator circuit 1312 and the CDR clock generator circuit 1310, to support half UI phase difference. Specifically, a desired sampling phase of the sampling clock CLK_S is at the middle of one symbol transmitted every UI, and a desired sampling phase of the sampling clock CLK_S' is at the edge of one symbol transmitted every UI. The skew between two clock generator circuits, including the data clock generator circuit 1312 and the CDR clock generator circuit 1310, may not be ignorable.

In this embodiment, the clock adjustment circuit 100 is arranged to deal with data skew calibration. The pattern filter circuit 102 is arranged to select first predetermined data patterns (i.e., ACQ patterns) S1 from consecutive data samples under an ACQ mode of skew calibration, wherein the consecutive data samples are derived from an output of the sampler circuit 1302. In this embodiment, the consecutive data samples d[k] are received by the pattern filter circuit 102 after passing through the receiver subsystem 1318. Specifically, the pattern filter circuit 102 performs ACQ pattern selection upon consecutive data samples, such that the first predetermined data patterns acts as ACQ patterns used by the PED circuit 104 under the ACQ mode of skew calibration, and the rest of the data patterns included in the consecutive data samples are blocked from arriving at the PED circuit 104. The PED circuit 104 is arranged to detect phase errors according to an output of the pattern filter circuit 102 and error samples derived from an output of the sampler circuit 1314. Specifically, the PED circuit 104 employs a PED function for phase error detection, where an output of the PED function depends on data sample(s) and error sample(s).

The phase error calculation circuit 106 is arranged to determine timing compensation of the sampling clock CLK_S according to the output of the PED circuit 104. For example, the phase error calculation circuit 106 may collect timing errors of different received PAMn symbols (e.g., PAM4 symbols) that are provided from the PED circuit 104, and accumulate the collected timing errors to provide timing compensation to the data clock generator circuit 1312. In this embodiment, the combining circuit 1316 may be implemented by an adder, such that an output of the phase error calculation circuit 106 and an output of the Bang-bang CDR circuit 1314 are combined to jointly control the data clock generator circuit 1312 for timing compensation of the sampling clock CLK_S that is used by the sampler circuit (e.g., data slicer) 1312 and the sampler circuit (e.g., skew slicer) 1314.

When the clock adjustment circuit 100 is switched from the ACQ mode to the TRK mode due to the lock point of skew calibration being close to the desired lock phase, the pattern switch control circuit 108 is operative to instruct the pattern filter circuit 102 to select second predetermined data patterns (i.e., TRK patterns) S2 from the consecutive data samples under the TRK mode of skew calibration, where each of the second predetermined data patterns (i.e., TRK patterns) S2 is different from any of the first predetermined data patterns (i.e., ACQ patterns) S1. In this way, the high speed SerDes receiver 1300 benefits from the clock adjustment circuit 100 to have a wide skew calibration range in the ACQ mode of skew calibration and high performance in the TRK mode of skew calibration.

Since a person skilled in the pertinent art can readily understand details of the clock adjustment circuit 100 used in the embodiment shown in FIG. 13 after reading above paragraphs directed to the clock adjustment circuit 100 used in the embodiment shown in FIG. 1, further description is omitted here for brevity.

It should be noted that, in some embodiments of the present invention, each of the clock generator circuit 16 and data clock generator circuit 1312 with timing compensation provided by the clock adjustment circuit 100 may support any I/O architecture such as common clock architecture, forward clock architecture, or embedded clock architecture.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A clock adjustment circuit comprising:
   a pattern filter circuit, arranged to select first predetermined data patterns from a plurality of consecutive data samples under an acquisition mode of the clock adjustment circuit, wherein the plurality of consecutive data samples are derived from an output of a first sampler circuit;
   a phase error detector (PED) circuit, arranged to detect phase errors according to an output of the pattern filter circuit and error samples derived from an output of a second sampler circuit;

a phase error calculation circuit, arranged to determine timing compensation of a sampling clock according to an output of the PED circuit, wherein the sampling clock is used by the first sampler circuit and the second sampler circuit; and a pattern switch control circuit, wherein in response to the clock adjustment circuit being switched from the acquisition mode to a tracking mode, the pattern switch control circuit is arranged to instruct the pattern filter circuit to select second predetermined data patterns from the plurality of consecutive data samples under the tracking mode of the clock adjustment circuit; and each of the second predetermined data patterns is different from any of the first predetermined data patterns.

2. The clock adjustment circuit of claim 1, wherein each of the first predetermined data patterns comprises a plurality of data samples, and a signal level difference between any two data samples among the plurality of data samples are constrained within a predetermined range.

3. The clock adjustment circuit of claim 2, wherein the plurality of consecutive data samples are derived from sampling a four-level pulse amplitude modulation (PAM4) signal according to the sampling clock, the plurality of data samples comprise a sequence of D[n−1], D[n], and D[n+1], and D[n] is equal to +3 or −3.

4. The clock adjustment circuit of claim 2, wherein the plurality of consecutive data samples are derived from sampling a four-level pulse amplitude modulation (PAM4) signal according to the sampling clock, the plurality of data samples comprise a sequence of D[n−1], D[n], and D[n+1], D[n] is equal to D[n−1], and D[n+1] is equal to +1 or −1.

5. The clock adjustment circuit of claim 4, wherein D[n] is equal to +3 or −3.

6. The clock adjustment circuit of claim 2, wherein the plurality of consecutive data samples are derived from sampling a four-level pulse amplitude modulation (PAM4) signal according to the sampling clock, the plurality of data samples comprise a sequence of D[n−1], D[n], and D[n+1], D[n] is equal to D[n+1], and D[n−1] is equal to +1 or −1.

7. The clock adjustment circuit of claim 6, wherein D[n] is equal to +3 or −3.

8. The clock adjustment circuit of claim 1, wherein the clock adjustment circuit is a part of a Baud-rate clock and data recovery (CDR) circuit, and is used for timing recovery.

9. The clock adjustment circuit of claim 1, wherein the clock adjustment circuit is a part of an application using a Bang-bang clock and data recovery (CDR) circuit, and is used for data skew calibration.

10. A clock adjustment method comprising:
performing a pattern filtering operation for selecting first predetermined data patterns from a plurality of consecutive data samples under an acquisition mode of the clock adjustment method, wherein the plurality of consecutive data samples are derived from an output of a first sampling operation;

performing phase error detection for detecting phase errors according to an output of the pattern filtering operation and error samples derived from an output of a second sampling operation;

performing a phase error calculation operation for determining timing compensation of a sampling clock according to an output of the phase error detection, wherein the sampling clock is used by the first sampling operation and the second sampling operation; and in response to the clock adjustment method being switched from the acquisition mode to a tracking mode, instructing the pattern filtering operation to select second predetermined data patterns from the plurality of consecutive data samples under the tracking mode of the clock adjustment method;

wherein each of the second predetermined data patterns is different from any of the first predetermined data patterns.

11. The clock adjustment method of claim 10, wherein each of the first predetermined data patterns comprises a plurality of data samples, and a signal level difference between any two data samples among the plurality of data samples are constrained within a predetermined range.

12. The clock adjustment method of claim 11, wherein the plurality of consecutive data samples are derived from sampling a four-level pulse amplitude modulation (PAM4) signal according to the sampling clock, the plurality of data samples comprise a sequence of D[n−1], D[n], and D[n+1], and D[n] is equal to +3 or −3.

13. The clock adjustment method of claim 11, wherein the plurality of consecutive data samples are derived from sampling a four-level pulse amplitude modulation (PAM4) signal according to the sampling clock, the plurality of data samples comprise a sequence of D[n−1], D[n], and D[n+1], D[n] is equal to D[n−1], and D[n+1] is equal to +1 or −1.

14. The clock adjustment method of claim 13, wherein D[n] is equal to +3 or −3.

15. The clock adjustment method of claim 11, wherein the plurality of consecutive data samples are derived from sampling a four-level pulse amplitude modulation (PAM4) signal according to the sampling clock, the plurality of data samples comprise a sequence of D[n−1], D[n], and D[n+1], D[n] is equal to D[n+1], and D[n−1] is equal to +1 or −1.

16. The clock adjustment method of claim 15, wherein D[n] is equal to +3 or −3.

17. The clock adjustment method of claim 10, wherein the clock adjustment method is a part of Baud-rate clock and data recovery (CDR), and is used for timing recovery.

18. The clock adjustment method of claim 10, wherein the clock adjustment method is a part of an application using Bang-bang clock and data recovery (CDR), and is used for data skew calibration.

* * * * *